Jan. 12, 1926.  
J. H. HANKEY  
SOLDERING APPARATUS  
Filed Sept. 15, 1924
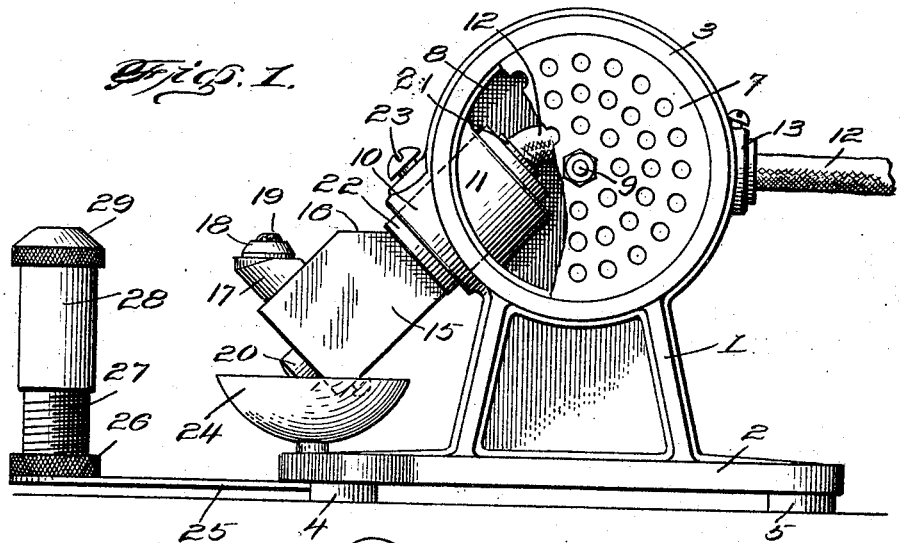
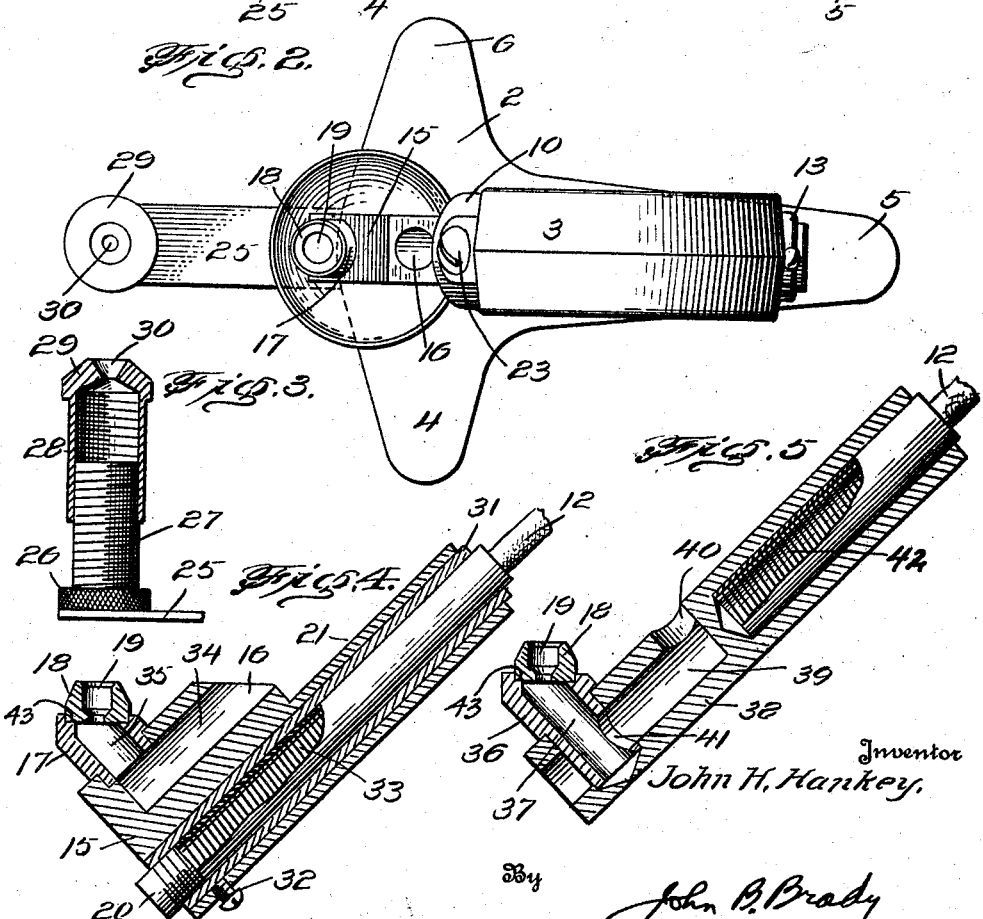
Inventor  
John H. Hankey,  
By John B. Brady  
Attorney Patented Jan. 12, 1926.

1,569,746

UNITED STATES PATENT OFFICE.

JOHN H. HANKEY, OF HAGERSTOWN, MARYLAND, ASSIGNOR TO THE W. H. REISNER MFG. COMPANY, OF HAGERSTOWN, MARYLAND, A CORPORATION OF MARYLAND.

SOLDERING APPARATUS.

Application filed September 15, 1924. Serial No. 737,352.

*To all whom it may concern:*

Be it known that I, JOHN H. HANKEY, a citizen of the United States, residing at Hagerstown, in the county of Washington and State of Maryland, have invented a certain new and useful Improvement in a Soldering Apparatus, of which the following is a specification.

My invention relates broadly to apparatus for forming mechanical and electrical junctions between metallic bodies and more particularly to an apparatus for soldering joints between two or more metallic members.

One of the objects of my invention is to provide a simplified construction of soldering apparatus which may be employed in shop production processes for reducing labor and saving time necessary in the forming of joints between two or more metallic members.

Another object of my invention is to provide a soldering apparatus in the form of a stand which may be readily mounted in a position convenient to an operator to provide a continuous supply of molten solder and soldering flux for the joining of two or more metallic members by a simple process of dipping.

Still another object of my invention is to provide a soldering apparatus having a solder fountain arranged adjacent a heating element in such manner as to continuously supply molten solder at a point convenient to an operator for the soldering of metallic members by a process of dipping the members into a supply of the solder.

A further object of my invention is to provide a construction of electrical heating element in a soldering head for maintaining the supply of solder in a molten state, the soldering head being arranged in the form of a differential balancing column whereby a substantially semi-spherical mass of molten solder protruding upwardly from the extremity of the column may be at all times presented as a fountain into which the metallic members to be soldered may be dipped.

My invention further resides in the construction and arrangement of parts of a flux fountain and a solder fountain supported adjacent each other upon a portable stand with a differential balancing column in the solder fountain arranged to be conductively heated from an electrical heating means for supplying a continuous mass of molten solder in the form of a semi-spherical body into which metallic members to be soldered may be dipped.

Other and further objects of my invention will be understood from the specification hereinafter following by reference to the accompanying drawings, wherein:

Figure 1 is a side elevation of the soldering apparatus of my invention; Fig. 2 is a plan view of the soldering apparatus; Fig. 3 is a view of the flux reservoir partially in section; Fig. 4 is a cross-sectional view taken through the differential balancing column of the solder fountain showing the arrangement of the electrical heating element adjacent thereto; and Fig. 5 shows a modified construction of solder fountain and its associated electrical heating element.

My invention finds particular application in the joining of wires of electromagnets to form a continuous electrical circuit between magnet bobbins used for various purposes. Heretofore in the art the soldering of fine wires in magnet coils has been tedious and has required a relatively large amount of time on the part of a skilled mechanic. It has been generally necessary to use a hand soldering iron brought to the desired soldering temperature, and the parts to be soldered have been first cleaned by applying a flux thereto, generally by wiping the flux over the parts by means of a small stick or other hand tool. The parts have had to be tinned by hand processes of wiping the hand iron over the parts and then the hand iron has had to be moved over the parts to complete the soldering process. This method has required a certain degree of skill on the part of a mechanic and requires an undesirable large period of time to complete the operation. With these and other disadvantages of prior methods in mind I have developed the soldering apparatus herein described which has been found to be efficient in use and practical in construction. I provide a stand on which is mounted a flux fountain and a solder fountain. Flux may be applied to the ends of a pair of twisted wires by dipping the wires in the flux fountain. The solder fountain is arrranged adjacent the flux fountain and is constructed in the form of a differential balancing column which is conductively heated by electrical means whereby a continuous supply of molten solder in the form of a semi-spherical body is provided. By reason of the hydraulic pressure secured by the molten solder in one side of the column the semi-spherical mass of solder is continuously buoyed upwardly to such an extent that the members to be soldered may be drawn through the projecting mass or may be dipped therein to form a tight mechanical and electrical connection of low resistivity. While I have described my invention as particularly applicable to the joining of magnet wires it will be understood that many other uses for the invention will present themselves and that I do not intend that the apparatus be limited in its use to the soldering of magnet wires.

Referring more particularly to the drawings, reference character 1 designates the body portion of the soldering apparatus having a base 2 supported at three foot portions, 4, 5, and 6. Centrally positioned upon the base 2 I provide a vertical cast portion having a cylindrical casing 3 at its extremity. The vertical casing 3 is in the form of a rim with a hollow interior closed on opposite sides by means of similar plates 7 and 8, perforated if desired and secured together by means of a laterally extending bolt 9. On one side of the cast rim 3 I provide a cast cylindrical bushing having a tubular opening extending along the axis thereof with portion 10 projecting outside of rim 3, and portion 11 projecting inside thereof and forming a support for the solder fountain 15. A cable 12 passes into the rim portion 3 through a bushing 13 extending from one side thereof and into the heating element which is mounted adjacent the solder fountain 15. The solder fountain 15 contains the differential balancing column for insuring the proper feeding of the molten solder. This column consists of bore 34 shown in Figure 4 which extends along an axis parallel to the axis of the bore of the tubular portion 21. One extremity of the bore 34 is mitered at an angle to the side of the solder fountain block 15 in a substantially horizontal line parallel with the base of the soldering apparatus. The other side of the differential balancing column is formed by a tubular member 17 having an interior bore 35 disposed substantially at right angles to the axis of bore 34. Carried in the upper extremity of the bore 35 and disposed upon a vertical axis with respect to the base of the soldering apparatus I provide an annular tip 18 having a central aperture 19 therein through which molten solder may freely pass. The tip 18 is constructed of material to which molten solder will not adhere. The column 17 is counterbored at 43 to firmly secure tip 18 in the extremity thereof. Heat is supplied to the solder fountain 15 from heating element 33 disposed within the tubular bore 21. A plug 20 is arranged to close the end of the tubular bore 21. The heating element 33 is contained within an electrically insulated tube 31 through which heat freely passes to the solder fountain by conduction. The complete heating element is secured in position in the solder fountain by means of set screw 32. Beneath the solder fountain and directly below the annular tip 18 I provide a cup shaped member 24 into which excess solder may drop during soldering operations to prevent the spilling of solder within the area immediately adjacent the soldering apparatus. Extending outwardly from the horizontal base 2 I provide a strip 25 for supporting the flux fountain. The strip 25 has the characteristic of low heat conductivity so that heat will not be conducted from the solder fountain through the support to any large extent. The flux therefore will remain in plastic condition and not waste away as a liquid. The flux fountain comprises a vertically extending screw member 27 with ferrule 26 at the base thereof and revolvable casing 28 upon the screw threaded portion 27. The revolvable casing 28 has a head 29 with a circumferential grip ring thereupon for revolving the casing with respect to the upstanding tube 27. An aperture 30 is provided in the upper extremity of the casing 28 giving access to the interior of the fountain. Soldering flux is disposed within the tubular member 27 and as casing 28 is screwed downwardly the soldering flux is forced vertically through aperture 30 providing a supply of flux into which the members to be soldered may be dipped.

In Fig. 5 I have illustrated a modified construction of solder fountain and electrical heating element. A tubular member 38 may be provided having a bore 39 extending throughout a portion of its length and provided with an entrance aperture 40 for solder. An elbow 36 is provided which closes the end of the bore 39 and which extends substantially at right angles to the axis of the bore 39. The elbow 36 has a bore 37 extending therethrough and is counterbored at 43 to receive tip 18 having an aperture 19 as hereinbefore described. The lower extremity of elbow 36 is provided with an aperture 41 which aligns with bore 39 enabling solder to pass freely from the inlet 40 to the outlet point 19. Heat is supplied to the solder in bore 39 from heating element 42 disposed in the upper portion of tubular member 38.

The member 21 or 38 is secured within the tubular portions 10 and 11 by means of a cylindrical tube 22 and a set screw 23 as represented in Figs. 1 and 2, in such position that solder is supplied to inlet 16 and fills the differential balancing column. By reason of the hydraulic phenomena involved in my invention the solder in the differential balancing column when it becomes heated tends to flow down the long column and up the short column to seek a position substantially upon a level at each end of the column. By reason of the surface tension of the heavy fluid comprising the solder the molten solder tends to assume a semi-spherical shape over the tip 18. This semi-spherical shape is particularly desirable in order that the fine wires or other members to be soldered may be passed directly through the molten solder and actually drawn backward and forward until a sufficient amount of solder has adhered to the members to form a mechanically tight joint and a junction of low electrical resistivity.

In the soldering operation which is capable of being performed with the apparatus of my invention it will be seen that unskilled labor may readily become familiar with the process of dipping the ends of members to be joined in the flux fountain aperture 30 and then in the molten mass of solder 19 in the solder fountain. When the members are withdrawn from the solder fountain the solder adheres to form an extremely neat junction. Solder may be renewed from time to time in the inlet 16 and it is possible to shut down or re-energize the apparatus from time to time by merely cutting off or turning on the electrical current supply to the heating coils.

While I have described my invention in certain particularly embodiments I desire that it be understood that modifications may be made and that no limitations upon the invention are intended other than those imposed by the scope of the appended claims.

What I claim and desire to secure by Letters Patent of the United States is as follows:

1. Soldering apparatus comprising in combination a soldering fountain and a flux fountain, said solder fountain consisting of a pair of balancing columns disposed at right angles one with respect to the other, one of said columns being substantially longer than the other of said columns and means for conductively heating solder contained in said columns.

2. Soldering apparatus comprising in combination a solder fountain and a flux fountain, said solder fountain consisting of a pair of balancing columns disposed at an angle one with respect to the other, one of said columns being substantially longer than the other and having a solder inlet port at one end thereof, and a soldering tip carried on the extremity of the other of said columns substantially in line with said solder inlet port, and means for conductively heating solder contained in said longer column.

3. Soldering apparatus comprising in combination a solder fountain and a flux fountain, said solder fountain consisting of a pair of balancing columns disposed substantially at an angle one with respect to the other, one of said columns being longer than the other of said columns and having a solder inlet port at the upper extremity thereof, the other of said columns being counterbored at its extremity and carrying a solder tip therein, means disposed parallel with said longer column for conductively heating solder contained therein whereby molten solder may be flowed over said solder tip.

4. Soldering apparatus comprising in combination a solder fountain and a flux fountain, said solder fountain consisting of a pair of balancing columns and a solder tip, said balancing columns being disposed substantially at an angle one with respect to the other, with one of said columns longer than the other of said columns, said solder tip disposed at an angle to the other of said columns, means for conductively heating the longer of said columns whereby molten solder may be flowed through said balancing columns and over said solder tip.

5. Soldering apparatus comprising in combination a solder fountain and a flux fountain, said solder fountain consisting of a pair of balancing columns and a solder tip, said balancing columns being disposed substantially at right angles one with respect to the other and one of said columns being substantially longer than the other of said columns, said solder tip being disposed substantially at an obtuse angle with respect to the other of said columns, and means for conductively heating said longer column whereby molten solder may be flowed through said columns and over said solder tip.

6. A solder fountain comprising a body member, a pair of balancing columns carried at one end of said body member, a solder inlet port at the extremity of one of said columns, and a solder tip, constructed of material to which solder will not adhere, carried at the extremity of the other of said columns, means carried in another portion of said body member for conductively heating solder contained in said columns whereby molten solder may be flowed through said columns and over said solder tip in the form of a substantially semi-spherical mass.

JOHN H. HANKEY.